Patented June 11, 1940

2,203,682

UNITED STATES PATENT OFFICE 2,203,682

LUMINESCENT MATERIAL AND METHOD OF PRODUCING THE SAME

Ted E. Foulke, Nutley, N. J., assignor, by mesne assignments, to General Electric Company, a corporation of New York No Drawing. Original application June 22, 1937, Serial No. 149,707. Divided and this application February 23, 1938, Serial No. 191,963. Renewed July 11, 1939

7 Claims. (Cl. 250—81)

The present invention relates to luminescent materials and to the method of producing these materials.

A particular object of the invention is to provide a novel fluorescent material which will have an extremely high luminous efficiency, and which will be especially suitable for use in electric discharge devices. A further object of the invention is to provide a novel and inexpensive method of producing this material. Still further objects and advantages of the invention will appear from the following detailed specification.

The invention consists in the new and novel composition of matter and in the novel steps of producing the same, as hereinafter set forth and claimed.

In an effort to improve the luminous efficiency of electric gaseous discharge devices various suggestions have been offered from time to time for the use of fluorescent coatings within these devices. Difficulties have been encountered, however, in putting these suggestions into effect, one of the most important of these difficulties being the rapid depreciation of these fluorescent coatings when exposed to a gaseous electric discharge. I have now discovered that magnesium tungstate is extremely effective and longlived when used within a gaseous discharge device to produce fluorescent light. Thus when used within the envelope of a mercury vapor lamp, for example, this magnesium tungstate has been found to depreciate in brilliancy at an extremely low rate so that a lamp having such a coating has a useful life of many thousands of hours. The light from such a lamp is moreover extremely desirable, since it closely approximates daylight. I have further found that the efficiency of such a coating is greatly increased if additional magnesium oxide is combined therewith. Thus the best results are obtained by heating together 2.9 parts by weight of tungsten oxide ($WO_3$) and 1 part of magnesium oxide (MgO), this being substantially the proportions indicated by the formula $Mg_2WO_5$ or $2MgO.WO_3$. With either increase or decrease of this ratio of $WO_3$ to MgO the brilliancy of the material under a given ultra violet excitation is reduced. Thus either an increase in this ratio to 4.0 or a reduction to 2.5 reduces the brilliancy of the coating under identical excitation by substantially 25%.

I have also found that the efficiency of my novel fluorescent coating is markedly affected by the impurities present therein. Thus even small amounts (less than 0.1% of the MgO component of my novel material) of manganese, chromium, arsenic, iron, molybdenum or of most of the rare earths have been found to very materially reduce the fluorescence of this material, and hence I have found it essential to eliminate any traces of these metals therefrom. Certain other metals, however, have been found to increase the fluorescence, and particularly the response to radiations shorter than 2537 A., and also to add other desirable characteristics to the material. Cadmium, lead, bismuth, thorium and cerium have all been found to have this favorable effect, and hence my invention further contemplates the addition of one or more of these metals in effective amounts, of the order of .05 to .5% of the MgO content of the fluorescent material.

The preparation of this fluorescent material is important if the maximum fluorescence is to be obtained therefrom, and hence the novel steps in the method of preparation thereof form a part of my invention. In this preparation I first take the purest tungstic oxide ($WO_3$) and magnesia (MgO) which are obtainable and then further purify them either by heating separately to a high temperature, of the order of 1200–1400° C., or by the preferred method of washing them separately in distilled water until all soluble alkalis have been removed, after which they are dried. This purification step is important, since thereupon depends the attainment of the greatest fluorescence from the resulting product, the alkali metals being particularly objectionable in my novel fluorescent material, since they limit the temperature at which the mass can be fired without hard sintering, with attendant loss of fluorescent efficiency, and also tend to produce a more crystalline powder, with still further loss in efficiency upon pulverization. The tungstic oxide and the magnesia are then mixed, preferably in the proportion of 2.9 parts by weight of $WO_3$ to 1 part of MgO, this being substantially in the proportion of one molecule of $WO_3$ to two molecules of MgO, as indicated by the formula $Mg_2WO_5$. Care is taken during this mixing to produce an intimate mixture without contaminating the mixture with particles from the container. Thus in particular any hard grinding with mortar and pestle is especially avoided. When thoroughly mixed a little distilled water is added to form a paste, and the desired impurities, such as cadmium, bismuth, lead, thorium and cerium, are also added at this time, preferably as nitrates or other easily decomposed compound. These additions are made in such proportions that the metal component thereof is from .05 to .5% of the MgO, or from 0.13 to .13% of the $Mg_2WO_3$, since these proportions have been found to give an exceptionally high fluorescent efficiency in the resulting product, the cadmium and bismuth being especially effective in this respect. The addition of any of these impurities has been further found to have another effect on the resulting product, in that they produce a soft flocculent powder which has many advantages over the coarser structure otherwise obtained by oven treatment. Thus first of all this powder is so soft that the usual loss in fluorescent efficiency which is well known to accompany ball-milling is entirely avoided. Furthermore the covering power of this powder is exceptionally high, since due to the flocculent nature thereof it provides a tenacious even film with about one-eighth of the material that is required to produce a satisfactory coating with coarse crystalline material. The depreciation of this coating when exposed to a gaseous discharge has furthermore been found to be less than that obtained with a more crystalline coating. It may be noted that the production of this soft powder is further facilitated by the initial choice of tungstic oxide of a low density or bulky type which is available on the market.

The pasty mixture thus produced is then dried at a temperature of the order of 150° C., a reaction thereupon occurring which changes the color of the mixture from yellow to white, this heating being continued until the reaction appears complete, as denoted by the change in color. At this stage the resulting mixture has no fluorescence.

The mixture is then placed in a furnace when it is slowly raised over a half-hour period to a temperature of approximately 850 to 900° C., and then maintained at this temperature for about a half hour, whereupon the material becomes highly fluorescent. The temperature attained in this heating is not highly critical, the essential feature being to keep it well below 1000° C., since at this temperature undesired changes occur which materially reduce the fluorescent efficiency of the resulting product, unless there has been an exceptionally perfect intermixture of the component parts beyond that usually attained. After this heating the mixture is allowed to cool and is then powdered, this requiring little pressure due to the softness of the material, so that there is virtually no loss in fluorescence.

In some cases, where it is desired to eliminate the addition of the impurities mentioned hereinbefore the MgO and the $WO_3$ are mixed with distilled water and boiled together until the reaction is complete, as denoted by the loss of the original yellow color. The mixture thus produced is also flocculent and has been found to have many of the characteristics of that prepared in the preferred way described hereinbefore.

The mixture produced in either of the foregoing ways is then put in a furnace and the temperature slowly increased for about an hour to approximately 1250° C., and then slowly cooled over a period of a half hour to approximately 1000 C. The powder is then removed from the furnace and is ready for use without further treatment.

Due to the extreme fineness of my novel material it is easily made into a paint which is flowed over the surface which it is desired to coat. Thus I prefer to mix 30 grams of the foregoing fluorescent material with 100 c. c. of amyl acetate, 50 c. c. of butyl acetate and 2 grams of relatively high viscosity nitrocellulose. This mixture is then ball milled, using glass marbles, for about 16 hours in order to produce a suspension of the fluorescent material in the vehicle. A surface is then coated with this paint and checked for light transmission against a desired standard, after which it is usually diluted further by similar relative proportions of the amyl acetate, butyl acetate and nitrocellulose until a desired density of coating is produced. In practice I find that a good coating is obtained with a dilution of the order of .2 gm. to .16 gm. of the magnesium tungstate per c. c. of the mixture.

The use of a mixture of butyl acetate and amyl acetate, as described above, has been found to be exceptionally desirable, since this mixture gives a uniformly smooth coating when flowed through a relatively long tube, for example, which firmly adheres to the glass wall thereof in the subsequent treatment thereof, as described hereinafter, a result which is not attainable with the use of either of these solvents separately.

The foregoing mixture is flowed over the surface which it is desired to coat, dried and baked. In the case of tubes for gaseous discharge lamps and the like this is easily accomplished by filling the tube with the mixture, draining thoroughly, and then allowing the adherent coating which remains to dry in air at room temperature, after which the tubing is baked at approximately 500° C. for say twenty minutes, air preferably being allowed to pass through the tubes during this baking period. The preliminary drying period allows the acetates to vaporize, of course, while the subsequent baking decomposes the nitrocellulose and drives it off as volatile gases, leaving only a thin film of the fluorescent material on the inner surface of the glass tube. This film, due to the flocculence and fineness of the material, is extremely adherent, despite the removal of the binder and successfully withstands all shocks which the tube may sustain in handling and shipment, although it may be removed where desired by abrasion.

While in the foregoing reference has been made only to the production of a magnesium tungstate fluorescent material, I have also discovered that zinc tungstate is likewise increased in fluorescent brilliancy if treated in the same manner. In this case, of course, the proportionate weights of the ZnO and the $WO_3$ are different, but the molecular proportions are the same as described for the MgO and $WO_3$, that is, for the most efficient coating these elements of the coating are mixed in substantially the proportion of two molecules of ZnO to one molecule of $WO_3$. The preferred treatment of this mixture is identical with that described hereinbefore for the magnesium coating.

While I have described my invention by reference to a preferred embodiment thereof, it is to be understood that various changes, omissions and substitutions, within the scope of the appended claims, may be made either in the composition or in the steps of the process without departing from the spirit of my invention.

This is a division of my copending application, Serial No. 149,707, filed June 22, 1937.

I claim as my invention:

1. The method of preparing a fluorescent material which comprises mixing substantially 2.9 parts by weight of tungsten oxide with 1 part of magnesium oxide which have been previously purified to a high degree, mixing therewith a compound of one of the metals of the group consisting of cadmium, lead, bismuth, thorium and cerium in such proportion that the metal of said compound comprises substantially .05 to .5% of the magnesium oxide, heating the mixture to a temperature of the order of 150° C. until the color of the mixture changes from yellow to white, then slowly raising the temperature to 850–900° C. for an interval, cooling and pulverizing the resulting product, then again slowly increasing the temperature thereof to approximately 1250° C., and then slowly cooling to 1000° C.

2. A luminescent material comprising MgO and $WO_3$ in the proportions indicated by the formula $Mg_2WO_5$.

3. A luminescent material comprising an oxide of the group consisting of MgO and ZnO in combination with tungstic oxide in the proportions of two molecules of the first mentioned oxide to one molecule of the tungstic oxide.

4. A luminescent material comprising MgO and $WO_3$ in substantially the proportions indicated by the formula $Mg_2WO_5$, together with an oxide of a metal of the group consisting of cadmium, lead, bismuth, thorium and cerium in such proportion that the metal of said oxide comprises from .05 to .5% by weight of the MgO content of the fluorescent material.

5. A luminescent material comprising MgO and $WO_3$ in the proportions of one part MgO to from 2.5 to 4 parts of $WO_3$.

6. A luminescent material comprising MgO and $WO_3$ in the proportions of one part MgO to from 2.5 to 4 parts of $WO_3$, said material being free of alkali metals.

7. A luminescent material comprising MgO and $WO_3$ in the proportions of one part MgO to from 2.5 to 4 parts of $WO_3$, said material being free of manganese, arsenic, iron and molybdenum as impurities.

TED E. FOULKE.